July 17, 1951  E. KOPPER ET AL  2,560,962
BATTERY CELL INDICATING DEVICE
Filed April 28, 1949
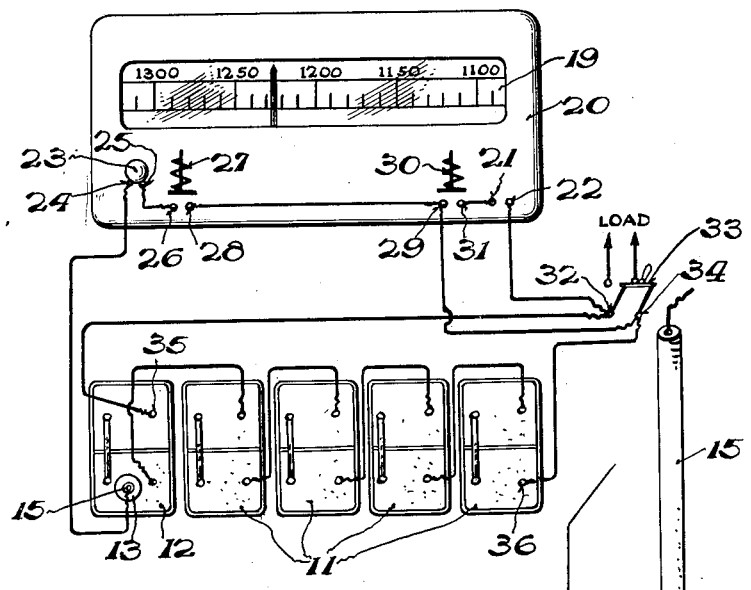
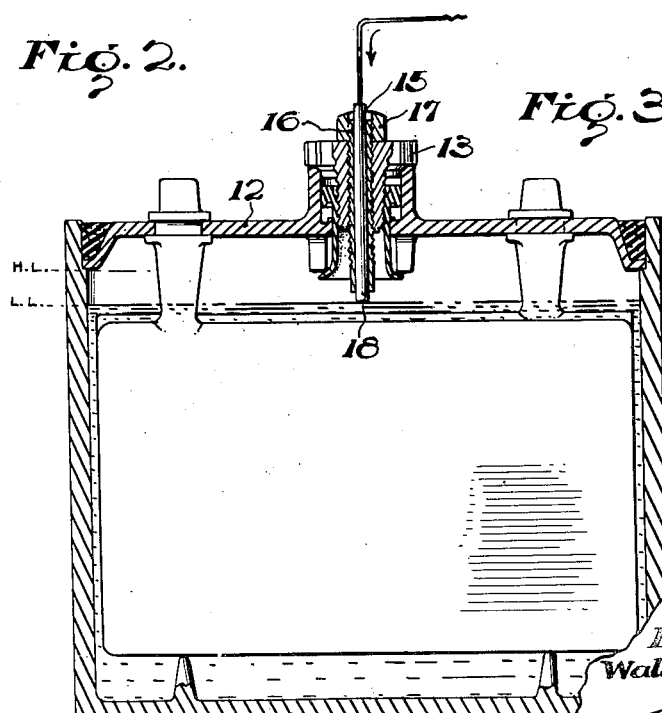
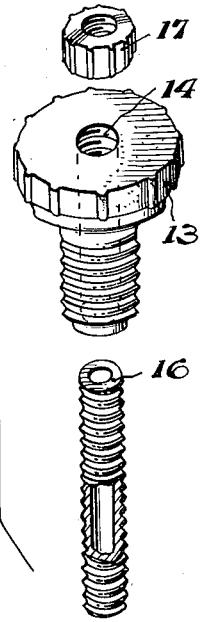
INVENTORS
Edward Kopper
Waldemar H. Radeke.
BY Timothy R. Groff
ATTORNEY Patented July 17, 1951

2,560,962

UNITED STATES PATENT OFFICE 2,560,962

BATTERY CELL INDICATING DEVICE

Edward Kopper, Winnetka, and Waldemar H. Radeke, Blue Island, Ill., assignors to Peerless Equipment Company, Chicago, Ill., a corporation of Delaware Application April 28, 1949, Serial No. 90,162

1 Claim. (Cl. 136—182)

This invention relates to a system for facilitating inspection of electric batteries and has particular application to the installation of batteries on railway cars.

In the railway field, passenger cars in particular, are provided with a group of storage batteries housed within a box or compartment supported on the frame of the car, said batteries supplying current for lamps, air-conditioning motor or fans and the like when the cars is standing in service or stopped at stations. These batteries are charged by the usual generator equipment when the car is in motion and are checked after each trip for gravity and electrolyte level by designated maintenance personnel. If the gravity or liquid level is below the predetermined standard in the batteries on a particular car, the number of the car and its battery deficiencies are noted on a gravity chart or on a level chart, and, depending on which fault exists the proper maintenance crew gives the required service. For example, if the gravity reading is low, the battery charging crew connects the batteries to a charging circuit, and if the liquid level is low, the flushing crew fills the battery cells to proper level.

Under the prevailing practice, the gravity and liquid level tests checks are made separately and with different types of rather crude or make-shift test equipment which consumes valuable time, and, moreover, the readings are often inaccurate because of the inefficient type of testing equipment. This is true, notwithstanding the fact that it is customary to check only the pilot cell of the group of batteries. When a number of cars make up a train it will be apparent that the time required to perform these checks becomes cumulative to the point where servicing is delayed, and, also the possibility of error in making and recording the checks is increased.

Accordingly, the primary object of the present invention is to provide a combined gravity and liquid level testing system for quickly giving the necessary data for each group of batteries within a car battery compartment, and thereby reducing maintenance costs as well as time out for service, while, at the same time, giving accurate information. Since the compartment which houses each group of batteries is permanently equipped with the standardized testing accessories, the chance of erroneous readings is reduced to a minimum because no skill is required in operating the system, and the car is expeditiously maintained at a maximum level efficiency for service operation.

A further object of the invention is to provide a simple and practical wiring arrangement and circuit closers for giving gravity indications and level indications.

Another object is to provide a simple and practical liquid level terminal unit which may be readily inserted in the filler cap of a pilot cell.

With the above and other objects in view which will more readily appear as the nature of the invention is better understood, the same consists in the novel construction and arrangement of parts, hereinafter more fully described, illustrated and claimed.

A preferred and practical embodiment of the invention is shown in the accompanying drawing in which:

Fig. 1 is a diagrammatic view illustrating the system as applied to a group of battery cells;

Fig. 2 is a vertical cross sectional view of a pilot cell showing the liquid level terminal.

Fig. 3 is an exploded view showing the parts of the liquid level terminal in perspective.

Similar reference characters designate corresponding parts throughout the several figures of the drawing.

Referring with more particularity to the drawing the embodiment illustrated comprises a group of batteries 11, a cell 12 of one of the batteries being selected as the pilot cell. The usual cover filling cap of the cell is substituted by a special device comprising a cap member 13 having a longitudinal bore 14, the wall of which is threaded. An electrode 15 of lead is covered with a hard insulating material 16, such as hard rubber or other suitable material, the outer surface of which is threaded to engage the threads of the bore 14 thereby permitting an adjustment of the electrode vertically in the cap 13. The electrode assembly comprising parts 15 and 16 is secured in adjusted positions by means of a nut 17 on top of the cap 13.

The lower tip 18 of the electrode is bare of insulating material so as to provide a satisfactory contact area with liquid in the cell 12.

An electric specific gravity meter 19 has terminals 21 and 22 and is mounted on a panel 20. An indicator 23, such as an electric bulb or other suitable device for showing when water need be added, is also mounted on the panel 20 and has terminals 24 and 25.

The electrode 15 is connected to terminal 24 of the indicator 23. The other terminal 25 is connected to a terminal 26 of a push button switch 27 mounted on the panel 20. The other terminal 28 of the switch is connected to a terminal 29 of a second push button switch 30 on the panel. The other terminal 31 of the second switch is connected to terminal 21 of the meter 19. The other terminal 22 of the meter is connected to one of the hinge terminals 32 of a double pole single throw switch 33. The other hinge terminal 34 of switch 33 is connected to the terminal 29 of the switch 30. The hinge terminal 32 is also connected to one extreme terminal 35 of the group of batteries. The other extreme terminal 36 of the group of batteries is connected to the other hinge terminal 34. The switch may, therefore, control delivery of a current to a load without affecting the operation of the testing equipment.

When it is desired to test the specific gravity of the batteries, the switch 30 is closed which has the effect of throwing the full voltage of the group of batteries between the terminals 35 and 36 across the terminals 21 and 22 of the specific gravity indicator. The latter is thereby actuated in proportion to the voltage to give a direct reading of the specific gravity as a function of the voltage.

When it is desired to test the water level, the switch 27 is closed thereby throwing the indicator 23 in series with that portion of the group of batteries between the electrode 15 and the terminal 36. If the water level in the cell 12 is sufficiently high to touch the terminal 15, the current will flow and actuate the indicator 23. Otherwise, the indicator will not be actuated, thereby making it known that water need be added to the cells. In this connection, it will be noted that the cell 12 is used as a pilot cell for the entire group of batteries. It serves to indicate the general condition of all of the other cells of the group.

The indicator 23 can be used to check different levels of liquid in the cell by adjusting the height of the electrode 15. This may be done by loosening the nut 17 and then turning the electrode with its insulating covering 16 until the proper height is reached and then again tightening the cap 17 to hold it in the adjusted position.

We claim:

In a battery cell having an opening, a member fitted in said opening, said member having an internally threaded longitudinal bore, a water indicating electrode assembly adjustable from the exterior of the battery without removal of said member therefrom, said assembly comprising a conductive member and an insulating sleeve thereabout, said sleeve being externally threaded to engage the internal threads of said bore, said electrode assembly having its upper end projecting above the top of the member for manual manipulation to adjust the conductor assembly to a given water level, and means at the exposed face of said member for engaging the upper exposed end of said assembly to secure the same in selected position relative to the said member.

EDWARD KOPPER.
WALDEMAR H. RADEKE.

REFERENCES CITED

The following references are of record in the file of this patent:

UNITED STATES PATENTS

| Number | Name | Date |
|---|---|---|
| 1,494,625 | Pierce | May 20, 1924 |
| 1,558,076 | Chamberlain | Oct. 25, 1925 |
| 1,594,814 | Brodin et al. | Aug. 3, 1926 |
| 1,634,176 | Cunliffe | June 28, 1927 |
| 1,753,381 | Levings | Apr. 8, 1930 |
| 2,056,578 | Lepore | Oct. 6, 1936 |
| 2,064,460 | Carr et al. | Dec. 15, 1936 |
| 2,181,182 | Goguen | Nov. 28, 1939 |

FOREIGN PATENTS

| Number | Country | Date |
|---|---|---|
| 285,622 | Great Britain | Feb. 23, 1928 |